(12) United States Patent
Okada et al.

(10) Patent No.: US 10,670,031 B2
(45) Date of Patent: Jun. 2, 2020

(54) COMPRESSOR (71) Applicant: MITSUBISHI HEAVY INDUSTRIES COMPRESSOR CORPORATION, Tokyo (JP)

(72) Inventors: Noriyuki Okada, Tokyo (JP); Hikaru Kurosaki, Tokyo (JP); Naoki Hirata, Tokyo (JP); Akira Hayashi, Tokyo (JP); Satoru Yoshida, Hiroshima (JP); Toru Yoshimune, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 1052 days.

(21) Appl. No.: 14/379,609

(22) PCT Filed: Feb. 21, 2013

(86) PCT No.: PCT/JP2013/054389
§ 371 (c)(1),
(2) Date: Aug. 19, 2014

(87) PCT Pub. No.: WO2013/125649
PCT Pub. Date: Aug. 29, 2013

(65) Prior Publication Data
US 2015/0037147 A1 Feb. 5, 2015

(30) Foreign Application Priority Data

Feb. 23, 2012 (JP) ................................. 2012-037722

(51) Int. Cl.
*F04D 29/08* (2006.01)
*F04D 29/62* (2006.01)
(Continued)

(52) U.S. Cl.
CPC ............ *F04D 29/083* (2013.01); *B23P 19/12* (2013.01); *F04D 17/08* (2013.01); *F04D 17/122* (2013.01);
(Continued)

(58) Field of Classification Search
CPC ...... F04D 29/083; F04D 17/122; F04D 17/08; F04D 17/10; F04D 19/00; F04D 19/02;
(Continued)

(56) References Cited

U.S. PATENT DOCUMENTS 2,215,701 A * 9/1940 Henselman ........... F16C 19/364
384/565
2,252,977 A * 8/1941 Palmgren ................ F16C 33/34
384/568
(Continued)

FOREIGN PATENT DOCUMENTS

| CN | 86 1 02901 | 11/1986 |
|---|---|---|
| CN | 1542289 | 11/2004 |

(Continued)

OTHER PUBLICATIONS

Extended European Search Report dated Sep. 28, 2015 in corresponding European Application No. 13751270.3.
(Continued)

*Primary Examiner* — Christopher Verdier
(74) *Attorney, Agent, or Firm* — Wenderoth, Lind & Ponack, L.L.P.

(57) ABSTRACT

A compressor includes a cylindrical casing, a bundle which includes a tubular stationary member and a rotor accommodated into the tubular stationary member, the bundle being configured to be inserted into an inner portion of the casing, and a roller configured to roll on an inner circumferential surface of the casing while supporting the bundle when the bundle is inserted into the inner portion of the casing along (Continued)

an axial direction. An outer circumferential surface of the roller is a continuous convex curved surface defined such that a curvature radius of an end side curved surface portion along a rotating shaft of the roller is smaller than a curvature radius of a center curved surface portion.

11 Claims, 8 Drawing Sheets

(51) Int. Cl.
| | | |
|---|---|---|
| F04D 17/12 | (2006.01) | |
| F04D 29/60 | (2006.01) | |
| F16C 29/04 | (2006.01) | |
| B23P 19/12 | (2006.01) | |
| F16C 35/063 | (2006.01) | |
| F04D 17/08 | (2006.01) | |
| F04D 19/00 | (2006.01) | |
| F16C 33/36 | (2006.01) | |

(52) U.S. Cl.
CPC ........... *F04D 19/00* (2013.01); *F04D 29/602* (2013.01); *F04D 29/624* (2013.01); *F16C 29/04* (2013.01); *F16C 35/063* (2013.01); *F16C 29/045* (2013.01); *F16C 33/36* (2013.01); *F16C 2226/14* (2013.01)

(58) Field of Classification Search
CPC .... F04D 29/602; F04D 29/624; F04D 29/644; F04D 29/601; F05B 2240/91; F05B 2240/911; F05B 2230/60; F05B 2230/604; Y10T 29/49696; F16C 29/04; F16C 33/36; F16C 35/063; F16C 2226/14; B23P 19/12; B23P 19/10
USPC ...................... 384/50, 52, 59, 549, 565, 568
See application file for complete search history.

(56) References Cited

U.S. PATENT DOCUMENTS

| | | | | |
|---|---|---|---|---|
| 3,306,687 A * | 2/1967 | Smith | ................... | F16C 23/086 384/450 |
| 3,713,712 A * | 1/1973 | Derner | ................... | F16C 33/34 384/565 |
| 3,799,694 A | 3/1974 | Duzan | | |
| 3,910,656 A | 10/1975 | Price et al. | | |
| 4,044,442 A | 8/1977 | Carlson | | |
| 4,329,795 A * | 5/1982 | Kalve | ..................... | E02F 9/121 212/175 |
| 4,723,852 A * | 2/1988 | Ehret | ..................... | E02F 9/006 29/898.07 |
| 5,971,702 A * | 10/1999 | Afton | ..................... | B23P 19/022 29/888.011 |
| 6,547,443 B2 * | 4/2003 | Hanai | ................... | F16C 19/225 384/450 |
| 8,974,176 B2 * | 3/2015 | Sasaki | ................... | F04D 17/122 415/199.2 |
| 2009/0257702 A1 * | 10/2009 | Solfrank | ................... | F16C 3/02 384/585 |
| 2012/0033909 A1 * | 2/2012 | Fujiwara | ................. | F16C 33/36 384/568 |
| 2012/0114279 A1 * | 5/2012 | Blanchin | ................. | F16C 33/36 384/568 |
| 2012/0243982 A1 * | 9/2012 | Sasaki | ................... | F04D 17/122 415/200 |

FOREIGN PATENT DOCUMENTS

| | | | | |
|---|---|---|---|---|
| EP | 0 289 697 | | 11/1988 | |
| EP | 2 045 472 | | 4/2009 | |
| GB | 140323 | A * | 3/1920 | ............. F16C 33/36 |
| GB | 1 327 646 | | 8/1973 | |
| JP | 7-102913 | | 4/1995 | |
| JP | 2000-38988 | | 2/2000 | |
| JP | 3495077 | B2 * | 11/2003 | ............. F16C 33/36 |
| JP | 2011-220307 | | 11/2011 | |

OTHER PUBLICATIONS

Office Action dated Oct. 10, 2015 in corresponding Chinese Application No. 201380007534.0, with English translation of Search Report.
Notice of Allowance dated May 26, 2015 in corresponding Japanese Application No. 2014-500928 (with English translation).
International Search Report dated May 21, 2013 in corresponding International Application No. PCT/JP2013/054389.
Translation of Written Opinion of the International Searching Authority dated May 21, 2013 in corresponding International Application No. PCT/JP2013/054389.

* cited by examiner

COMPRESSOR

CROSS-REFERENCE TO RELATED APPLICATION

Priority is claimed from Japanese Patent Application No. 2012-037722, filed Feb. 23, 2012, the content of which is incorporated herein by reference.

TECHNICAL FIELD

The present invention relates to a compressor configured to compress a fluid.

BACKGROUND ART

In a compressor of the related art, an outline, which is configured so as to incorporate a rotor, a rotor blade, and a stator blade into an inner portion of a cylindrical housing (bundle housing), is configured so that a cylindrical bundle (compressor•bundle) is inserted into an inner portion of a cylindrical casing (casing) (for example, refer to Japanese Unexamined Patent Application, First Publication No. 2011-220307).

In this kind of compressor, the bundle is inserted from an opening portion provided on one end side in an axial direction of the casing into the casing in the axial direction, and thus, the compressor can be assembled. In the related art, in order to smoothly perform the insertion of the bundle, a roller, which supports the weight of the bundle and rolls on an inner circumferential surface of the casing in the axial direction when the bundle is inserted into the casing, is provided on a vertically lower portion of the bundle.

Accordingly, when the bundle is inserted into the casing, an outer circumferential surface of the roller is pressed against the inner circumferential surface of the casing by the weight of the bundle.

Problem to be Solved by the Invention

However, in the state where the outer circumferential surface of the roller is pressed against the inner circumferential surface of the casing, the end side along a rotating shaft of the roller on the outer circumferential surface of the roller is more strongly and easily pressed than the center side. In other words, a surface pressure (Hertz surface pressure) which presses the outer circumferential surface of the roller to the inner circumferential surface of the casing is larger on the end side along the rotating shaft of the roller than on the center, and thus, so-called partial contact easily occurs.

Particularly, a compressor in recent years, an increase in the size and an increase in the pressure are needed, and accordingly, the weight of the bundle is likely to be increased. Therefore, if the above-described partial contact occurs, a scratch (impression) of the roller pressed against the inner circumferential surface of the casing occurs, there is a problem in that a decrease in the quality of the compressor such as a damage to airtightness occurs.

Moreover, as a general method for alleviating the deviation of the above-described surface pressure, it is considered that a diameter of the roller is set to be large. However, in the compressor, a clearance between the bundle and the inner circumferential surface of the casing is set to be significantly small to prevent leakage of a compressed fluid. In addition, the roller may be disposed so as to be embedded in the bundle. However, in this case, the thickness of the bundle in the vicinity of the embedded portion is limited by the diameter of the roller and the diameter of the bundle, and a shortage in strength of the bundle may occur. Accordingly, the diameter of the roller should be small if possible.

SUMMARY OF INVENTION

An object of the present invention is to provide a compressor capable of suppressing a decrease in the quality of the compressor by preventing partial contact of a roller with respect to an inner circumferential surface of a casing.

Means for Solving the Problem

According to an aspect of the present invention, there is provided a compressor including: a cylindrical casing; a bundle which includes a tubular stationary member and a rotor accommodated into the stationary member, and is inserted into an inner portion of the casing; and a roller configured to roll on an inner circumferential surface of the casing while supporting the bundle when the bundle is inserted into the inner portion of the casing along an axial direction, in which an outer circumferential surface of the roller is formed in a continuous convex curved surface so that a curvature radius of an end side along a rotating shaft of the roller is smaller than a curvature radius of a center in a state where at least the outer circumferential surface of the roller abuts the inner circumferential surface of the casing.

According to the compressor, since the outer circumferential surface of the roller is formed in the convex curved surface (crowning shape) along the rotating shaft of the roller, the outer circumferential surface of the roller can abut along the inner circumferential surface of the casing. As a result, an increase in the deviation of a surface pressure along the rotating shaft of the roller can be suppressed. In order words, uniformity in the distribution of the surface pressure along the rotating shaft of the roller can be improved.

Moreover, in the outer circumferential surface of the roller formed in the convex curved surface, the curvature radius of the end side in the rotation axis direction of the roller is set to be smaller than the curvature radius of the center in the rotation axis direction of the roller. As a result, the surface pressure in the range of the end side in the rotation axis direction of the roller is securely prevented from being larger than the surface pressure in the center range, that is, occurrence of a partial contact can be securely prevented.

Moreover, the convex curved surface is formed to be continuous from the center of the outer circumferential surface of the roller toward the end side, that is, the outer circumferential surface of the roller is formed in a curved surface which is smoothly continued from the center toward the end side. Accordingly, the curvature center of the bundle is positioned to be deviated from the axis of the casing or the like, and thus, even when the position of the outer circumferential surface of the roller strongly abutting the inner circumferential surface of the casing is shifted from the center to the end side, the surface pressure between the center of the outer circumferential surface and the end side can be suppressed from being excessively larger than the surface pressures of other portions.

Moreover, in the compressor, the outer circumferential surface of the roller may include a center curved surface portion which is formed to be a curvature radius corresponding to a curvature radius of the inner circumferential surface of the casing in a center range along the rotating shaft, and an end side curved surface portion which is set to be smaller than the curvature radius of the center curved surface portion on both end sides of the center curved surface portion.

According to the compressor, since the curvature radius of the center curved surface portion corresponds to the curvature radius of the inner circumferential surface of the casing, in a state where the curvature center of the center curved surface portion is coincident with the axis of the inner circumferential surface of the casing, only the center curved surface portion abuts the inner circumferential surface of the casing, and the end side curved surface portion having the smaller curvature radius than the center curved surface portion does not abut the inner circumferential surface. Accordingly, the partial contact of the roller can be securely prevented.

Moreover, in this state, since the center curved surface portion is evenly pressed against the inner circumferential surface of the casing, an increase in the deviation of the surface pressure along the rotating shaft of the roller can be suppressed. In other words, uniformity in the distribution of the surface pressure along the rotating shaft of the roller can be improved.

In addition, the curvature center of the bundle is positioned to be deviated from the axis of the casing or the like, and thus, even when the position of the outer circumferential surface of the roller strongly abutting the inner circumferential surface of the casing is shifted from the center curved surface portion to the end side curved surface portions side, since the center curved surface portion and the end side curved surface portion are smoothly continued, the surface pressure between the center curved surface portion and the end side curved surface portion can be suppressed from being excessively larger than the surface pressures of other portions.

Moreover, the curvature center of the bundle is positioned to be deviated from the axis of the casing or the like, and thus, even when the end side curved surface portion of the roller is pressed against the inner circumferential surface of the casing, since the curvature radius of the end side curved surface portion is set to be smaller than that of the center curved surface portion, the surface pressure on the end side curved surface portion can be securely prevented from being larger than the surface pressure on the center curved surface portion, that is, the occurrence of partial contact of the roller can be securely prevented.

Moreover, in the compressor, when the roller is disposed at a position which is deviated from a vertically lower end in the inner circumferential surface of the casing to a circumferential direction of the inner circumferential surface, a curvature radius of the end side curved surface portion positioned at the vertically lower side may be smaller than a curvature radius of the end side curved surface portion positioned at the upper side.

In a state where the roller abuts the inner circumferential surface of the casing so that the rotating shaft of the roller is inclined to the horizontal surface, the position of the outer circumferential surface of the roller strongly abutting the inner circumferential surface of the casing is easily shifted to one end side curved surface portion side which is positioned vertically below the center curved surface portion due to the weight of the bundle.

Accordingly, as the above-described configuration, since the curvature radius of the one end side curved surface portion is set to be smaller than the curvature radius of the other end side curved surface portion positioned vertically above the center curved surface portion, the occurrence of partial contact on the end side positioned vertically below the center can be securely prevented.

In addition, in the compressor, a hole which extends from an end surface of the roller in a rotation axis direction may be formed in the roller in a range of an end side along the rotating shaft.

Moreover, in the compressor, the hole may be annularly formed about the rotating shaft.

According to the configuration having the formed hole, the curvature center of the bundle is further deviated from the axis of the casing, and thus, even when the range of the end side on the outer circumferential surface of the roller is pressed against the inner circumferential surface of the casing, the hole is shrunk in the radial direction of the roller, and the range of the end side can be deformed to the inner side in the radial direction of the roller. Moreover, if the hole is annularly formed, the range of the end side can be more easily deformed to the inner side in the radial direction.

According to the deformation, the curvature radius in the range of the end side in the rotation axis direction of the roller is smaller than the curvature radius of the center range, the surface pressure in the range of the end side is suppressed so as to be smaller than the surface pressure of the center range, and the occurrence of partial contact can be prevented.

In addition, in the compressor, the hole may be formed in a V shaped cross-section which is gradually narrowed from the end surface of the roller in a depth direction of the hole.

Moreover, in the compressor, the roller may include a roller main body which is formed of a material having lower hardness than that of the casing, and a rotating shaft which is provided to be inserted into the roller main body and is formed of a material having higher strength than that of the roller main body.

Moreover, in the compressor, the roller main body may be fixed to the rotating shaft by shrinkage fitting.

Effects of the Invention

According to the present invention, a partial contact or the like of a roller with respect to an inner circumferential surface of a casing is prevented, and an increase in the deviation of a surface pressure along a rotating shaft of the roller can be suppressed. Accordingly, occurrence of impression on the inner circumferential surface of the casing is prevented, and a decrease in the quality of a compressor can be suppressed.

DESCRIPTION OF EMBODIMENTS

First Embodiment

Hereinafter, a first embodiment of the present invention will be described with reference to FIGS. 1 to 4.

Figure 1:
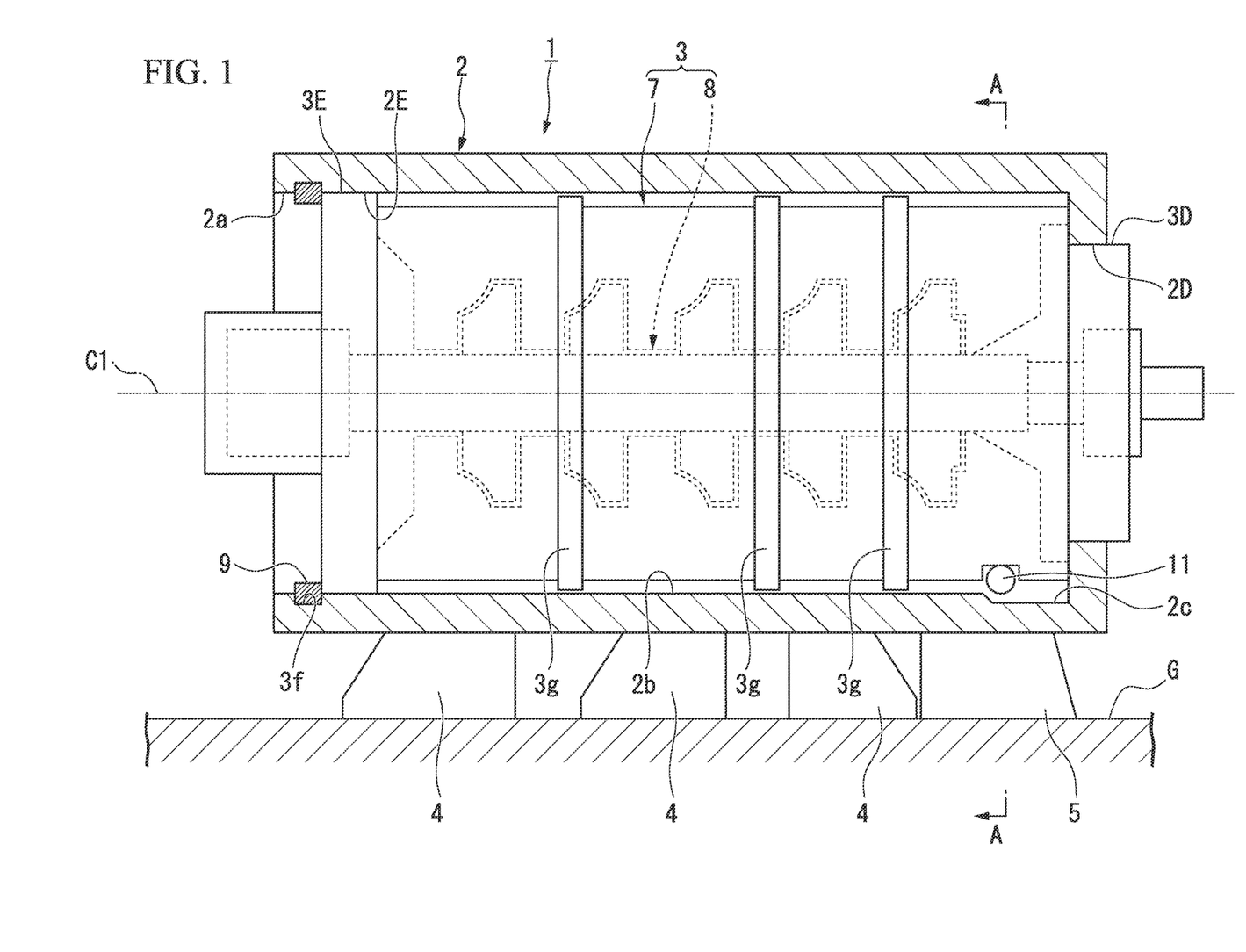
FIG. 1 is a schematic cross-sectional view showing a compressor according to a first embodiment of the present invention.

As shown in FIG. 1, a compressor 1 according to an embodiment of the present invention is an axial flow type compressor or a centrifugal type compressor, and includes a cylindrical casing 2 and a bundle 3 which is inserted into the casing 2.

One end (the left side in FIG. 1) in an axis C1 direction of the casing 2 is widely opened as an opening portion 2a configuring an inlet for inserting the bundle 3. That is, the bundle 3 described below is inserted from one end of the casing 2 toward the other end.

A plurality (3 in the shown example) of suction nozzles 4 and one discharge nozzle 5 are provided so as to protrude on the outer circumferential portion of the casing 2. The suction nozzles 4 and the one discharge nozzle 5 along with a support leg member (not shown) or the like provided on the casing 2 are provided so that the casing 2 is positioned at a predetermined height with respect to an installation surface G and the axis C1 of the casing 2 is horizontal.

In the bundle 3, a rotor 8 is rotatably provided in an inner portion of a stationary member 7 having a cylindrical outline. Moreover, for example, when the compressor 1 is an axial flow type, the stationary member 7 is configured so that a stator blade is provided in a cylindrical bundle casing and the rotor 8 is configured so that a rotor blade is provided on a shaft body.

Stepped fitting outer diameter portions 3D and 3E are formed on a front end portion and a rear end portion in an insertion direction of the bundle 3. The fitting outer diameter portions 3D and 3E are tightly fitted to inner circumferential portions of fitting inner diameter portions 2D and 2E provided on a front end portion (one end portion) and a rear end portion (the other end portion) of the casing 2, respectively. By the fitting, the bundle 3 is positioned so that the axis of the bundle 3 is coincident with the axis C1 of the casing 2.

Moreover, several airtight ribs 3g are formed on the outer circumferential portion of the bundle 3, and minute clearances are set between the airtight ribs 3g and the inner circumferential surface 2b of the casing 2.

Figure 2:
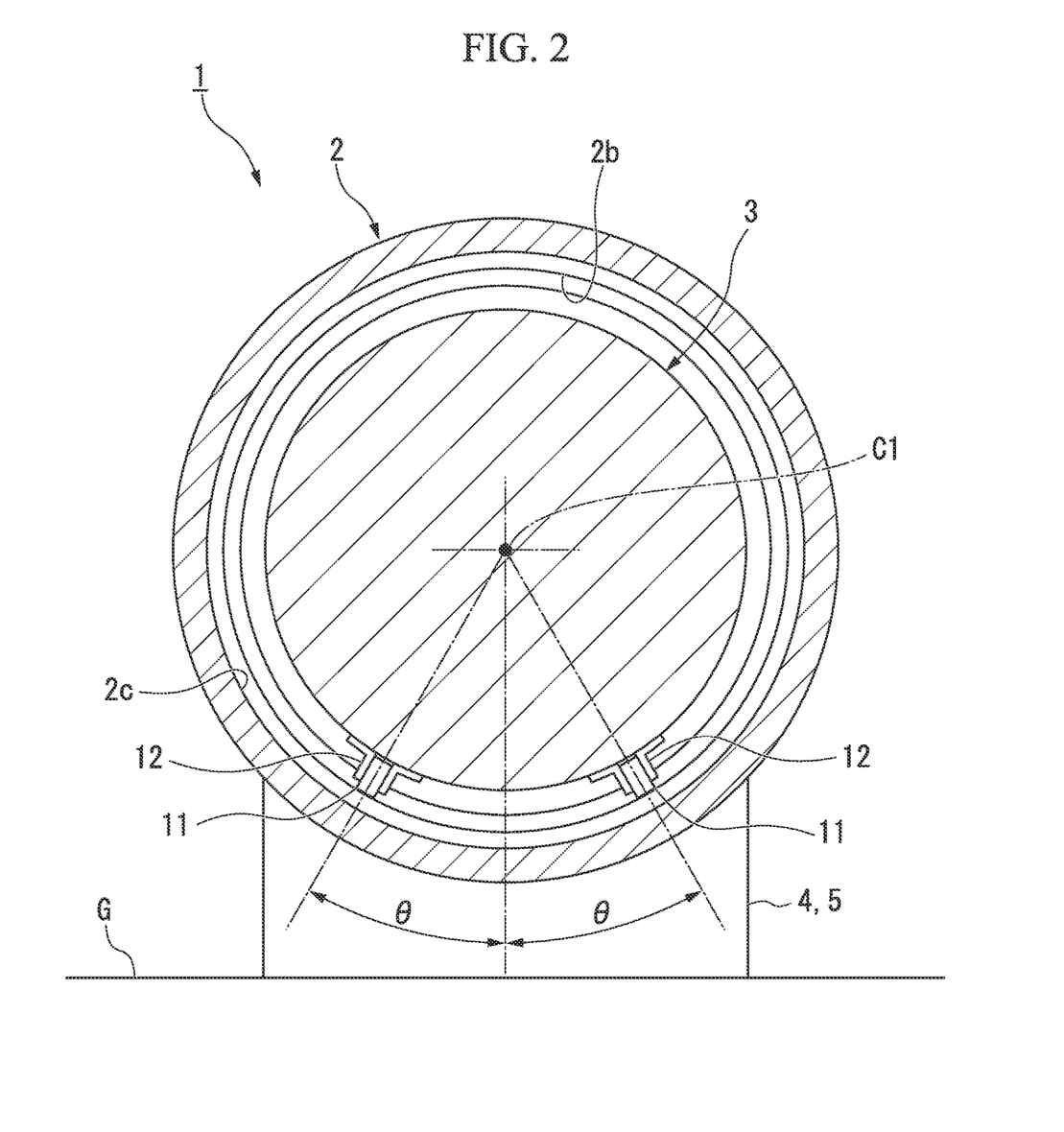
FIG. 2 is a cross-sectional view taken along line A-A in FIG. 1.

Moreover, as shown in FIGS. 1 and 2, a pair of right and left rollers 11 is provided on a lower portion in the vicinity of the front end of the bundle 3. When the bundle 3 is inserted into the casing 2, the rollers 11 abut and roll on the inner circumferential surface 2b of the casing 2 while supporting the weight of the bundle 3.

The pair of rollers 11 is disposed so as to be deviated by a predetermined angle θ in the circumferential direction of the bundle 3 or the casing 2 in directions opposite to each other from a vertically lower end of the bundle 3 or the casing 2.

In addition, the angle θ is determined considering the disposition of the bundle 3, the suction nozzles 4, and the discharge nozzle 5, and for example, is set to 35°.

An annular and grooved recessed portion 2c, which is recessed from the inner circumferential surface 2b to the outside in the radial direction, is formed on the lower portion in the vicinity of the front end of the casing 2.

As shown in FIG. 1, in a state where the bundle 3 is completely inserted into the casing 2 and is positioned, the above-described roller 11 is positioned within the range of the recessed portion 2c, and thus, the recessed portion 2c prevents contact between the roller 11 and the inner circumferential surface 2b of the casing 2. That is, in the state shown in FIG. 1, the roller 11 does not abut the inner circumferential surface 2b of the casing 2 and floats in the air.

In addition, a fitting groove 3f recessed from the inner circumferential surface 2b is formed in the vicinity of the rear end of the casing 2, and a lock ring 9 is fitted to the fitting groove 3f. The lock ring 9 plays a role which regulates a movement of the bundle 3 in the axis C1 direction with respect to the casing 2 in the position in which the bundle 3 is completely inserted into the casing 2, and also plays a role as a seal member which prevents a compressed fluid from being leaked from a space between the inner circumferential surface 2b (fitting inner diameter portion 2E) of the casing 2 and the outer circumferential surface of the bundle 3 (fitting outer diameter portion 3E).

Moreover, the inner diameter of the inner circumferential surface 2b in a range, in which the roller 11 rolls on the casing 2 configured as described above, may be set to be the same along the axis C1. However, for example, in order to easily insert the bundle 3 into the casing 2, the inner diameter may be set to be gradually decreased from the opening portion 2a of the casing 2 toward the insertion direction.

In the compressor 1 schematically configured as described above, the rotor 8 is driven to rotate at high speed by an electric motor (not shown) or the like, the fluid is introduced from the suction nozzles 4 to the inner portion of the bundle 3, and after the fluid is compressed in stages, the fluid is discharged from the discharge nozzle 5 to the outside of the bundle 3.

Next, a structure of the roller 11 which is a characteristic portion of the present embodiment will be described in detail.

Figure 3:
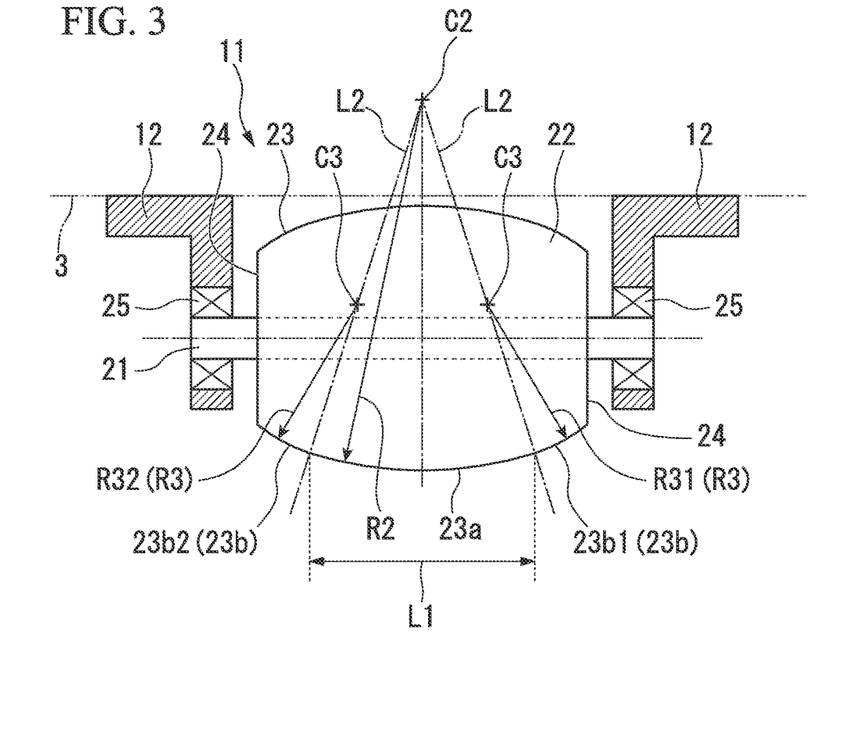
FIG. 3 is a schematic cross-sectional view showing an enlarged roller in the compressor of FIG. 1.

As shown in FIGS. 2 and 3, the roller 11 is mounted on brackets 12 fixed to the lower portion in the vicinity of the front end of the bundle 3, and includes a rotating shaft 21 and a roller main body 22 having an approximately cylindrical shape.

Both ends of the rotating shaft 21 are supported by bearings 25 fixed to the brackets 12. The rotating shaft 21 is formed of a material (for example, an iron based material or the like) having a large Young's modulus to support the weight of the bundle 3.

The roller main body 22 is a portion which abuts the inner circumferential surface 2b of the casing 2, is fitted to the outer circumferential portion of the rotating shaft 21 by shrinkage fitting or the like, and is integrally fixed to the rotating shaft 21. The roller main body 22 is formed of a material which has a Young's modulus smaller than that of the rotating shaft 21 or the casing 2. As a specific example of the material of the roller main body 22, there is a copper-based material. However, for example, when the fluid used in the compressor 1 is corrosive gas, preferably, the material of the roller main body 22 is a material having a high corrosion resistance (for example, gray cast iron (FC), nodular graphite cast iron (FCD), or the like).

In the outer circumferential surface 23 of the roller main body 22 abutting the inner circumferential surface 2b of the casing 2, the center portion in the rotation axis direction is formed to a convex curved surface (crowning shape) which expands to the outside in the radial direction, and a curvature radius of both end sides in the direction of the rotating shaft 21 is set to be smaller than that of the center portion. Moreover, the convex curved surface is formed to be continuous from the center of the outer circumferential surface 23 of the roller main body 22 toward the end side.

Specifically, the outer circumferential surface 23 of the roller main body 22 is configured of a center curved surface portion 23a which is formed at a curvature radius R2 corresponding to a curvature radius of the inner circumferential surface 2b of the casing 2 in a center range along the rotating shaft 21, and a pair of end side curved surface portions 23b having a curvature radius smaller than that of the center curved surface portion 23a at both end sides of the center curved surface portion 23a.

In a state where at least a curvature center C2 (and a curvature center of the bundle 3) of the center curved surface portion 23a is positioned on the axis C1 of the casing 2, the center curved surface portion 23a contacts the inner circumferential surface 2b of the casing 2 in the circumferential direction about the curvature center C2.

Moreover, for example, the curvature radius R2 of the center curved surface portion 23a may be set to be the same as the curvature radius of the inner circumferential surface 2b of the casing 2. However, in a state where the roller main body 22 is elastically deformed by the weight of the bundle 3, the center curved surface portion 23a may be set to contact the inner circumferential surface 2b of the casing 2 in the circumferential direction about the curvature center C2. That is, for example, in a state where the roller main body 22 does not contact the inner circumferential surface 2b of the casing 2, the curvature radius R2 of the center curved surface portion 23a may be set to be slightly smaller than the curvature radius of the inner circumferential surface 2b.

In the state where the center curved surface portion 23a contacts the inner circumferential surface 2b of the casing 2 in the circumferential direction about the curvature center C2, a width dimension L1 (hereinafter, referred to as an effective width L1) of the center curved surface portion 23a along the rotating shaft 21 is set so that a surface pressure by which the center curved surface portion 23a is pressed against the inner circumferential surface 2b of the casing 2 is less than or equal to an allowable value (a boundary value whether or not impression of the roller 11 occurs on the inner circumferential surface 2b of the casing 2).

In the state where the center curved surface portion 23a contacts the inner circumferential surface 2b of the casing 2 in the circumferential direction about the curvature center C2, a curvature radius R3 or a width dimension along the rotating shaft 21 of the end side curved surface portion 23b is set so that the end side curved surface portion 23b does not contact the inner circumferential surface 2b of the casing 2.

In addition, the curvature center C2 (and the curvature center of the bundle 3) of the center curved surface portion 23a is positioned to be deviated from the axis C1 of the casing 2, the curvature radius R3 or the width dimension along the rotating shaft 21 of the end side curved surface portion 23b is set so that even when the position of the outer circumferential surface 23 of the roller main body 22 strongly abutting the inner circumferential surface 2b of the casing 2 is shifted from the center curved surface portion 23a to the end side curved surface portion 23b side, a corner between the end side curved surface portion 23b and an end surface 24 in the direction of the rotating shaft 21 of the roller main body 22 does not contact the inner circumferential surface 2b of the casing 2.

In addition, as for reasons that the curvature center C2 of the center curved surface portion 23a is positioned to be deviated from the axis C1 of the casing 2, for example, there are manufacturing errors of the compressor 1 largely configured (for example, machining errors of components of the compressor 1, assembly errors of the bundle 3 with respect to the casing 2, or the like), or the change of the inner diameter (curvature radius) of the inner circumferential surface 2b of the casing 2 along the axis C1.

As a phenomenon that the position of the outer circumferential surface 23 of the roller main body 22 strongly abutting the inner circumferential surface 2b of the casing 2 is shifted from the center curved surface portion 23a to the end side curved surface portion 23b side, there are two kinds of cases, that is, a case where only the end side curved surface portion 23b positioned vertically below the center curved surface portion 23a strongly abuts the inner circumferential surface 2b by the weight of the bundle 3 or the like, and a case where the curvature radius of the inner circumferential surface 2b of the casing 2 is changed to be smaller than the curvature radius of the center curved surface portion 23a, and both end side curved surface portions 23b which are located on each side of the center curved surface portion 23a strongly abut the inner circumferential surface 2b.

Moreover, the curvature center C3 of the end side curved surface portion 23b is set to be positioned on a virtual line L2 which connects the end portion in the circumferential direction about the curvature center C2 of the center curved surface portion 23a and the curvature center C2 so that the end side curved surface portion 23b is a curved surface continuous from the center curved surface portion 23a along the rotating shaft 21, in other words, so that the center curved surface portion 23a and the end side curved surface portion 23b are smoothly continuous to each other.

In addition, the curvature radius R3 of the pair of end side curved surface portions 23b may be set to be the same as each other. However, as the present embodiment, in a case where the roller 11 abuts the inner circumferential surface 2b of the casing 2 so that the rotating shaft 21 is inclined with respect to the horizontal surface, it is preferable to set the curvature R31 of the one end side curved surface portion 23b1 positioned at the vertically lower side to be smaller than the curvature radius R32 of the other end side curved surface portion 23b2 positioned at the upper side.

Next, with respect to the compressor 1 having the above-described configuration, a procedure by which the bundle 3 is inserted into the casing 2 will be described with reference to FIGS. 4A to 4C.

Figure 4A:
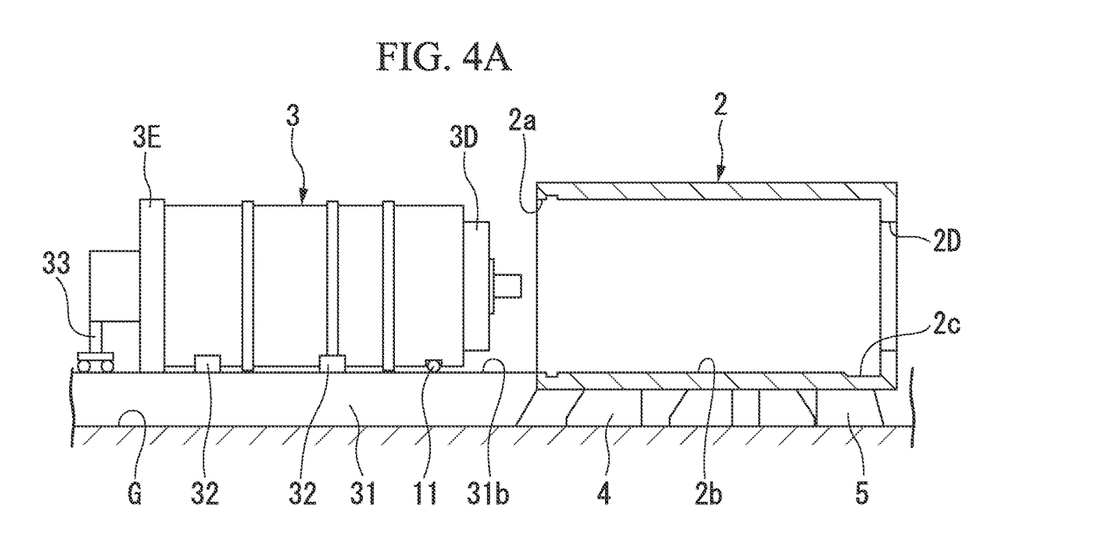
FIG. 4A is a schematic cross-sectional view showing an assembly method of the compressor shown in FIGS. 1 and 2.

When the bundle 3 is inserted into the casing 2, as shown in FIG. 4A, after the bundle 3 is disposed on an upper surface 31*b* of a mounting table 31 in advance, the bundle 3 and the mounting table 31 are disposed on the opening portion 2*a* of the casing 2.

Moreover, the upper surface 31*b* of the mounting table 31 is formed in a shape similar to the lower end portion of the inner circumferential surface 2*b* of the casing 2, and is set to a height which is coincident with the lower end portion of the inner circumferential surface 2*b*. Accordingly, the roller 11 of the bundle 3 can roll on the upper surface 31*b* of the mounting table 31 in the insertion direction. In addition, supporting portions 32 supporting both side portions in the insertion direction of the bundle 3 are provided on the mounting table 31, and the supporting portions 32 prevent the bundle 3 from being deviated laterally with respect to the opening portion 2*a* of the casing 2.

Figure 4B:
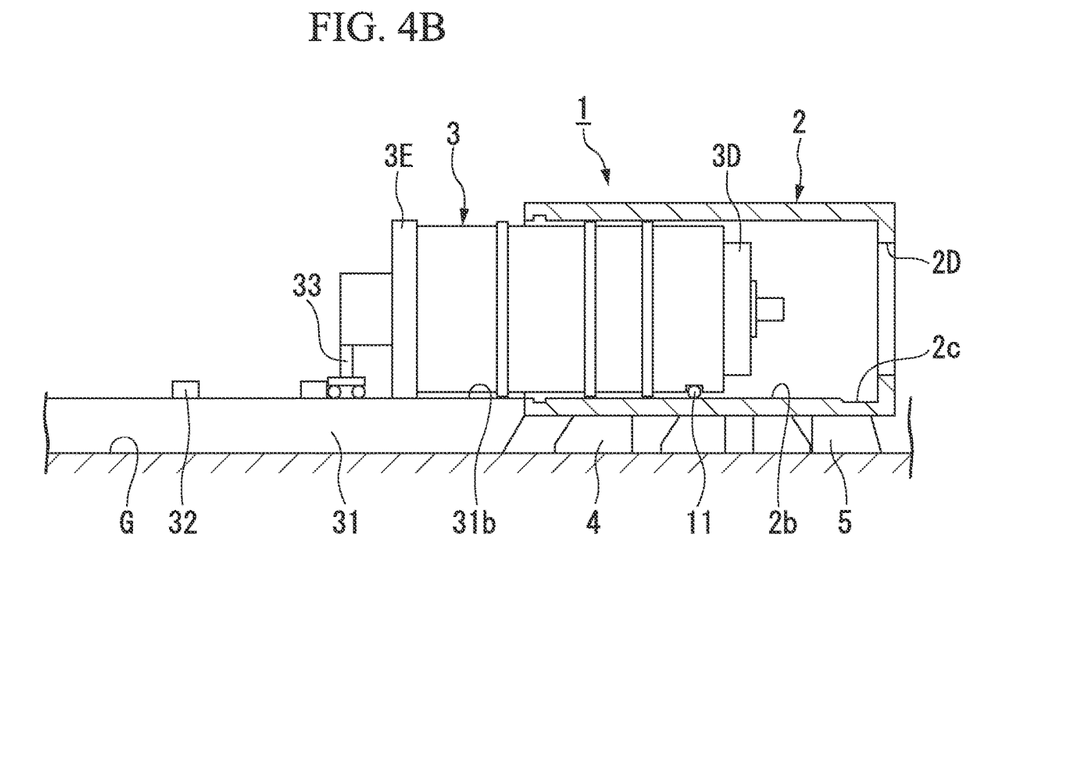
FIG. 4B is a schematic cross-sectional view showing the assembly method of the compressor shown in FIGS. 1 and 2.

Moreover, the insertion of the bundle 3 with respect to the casing 2 is performed as FIG. 4B in a state where the rear end portion of the bundle 3 is supported by the bogie 33. When the insertion is performed, since the weight of the front end portion of the bundle 3 is supported by the roller 11, the bundle 3 can be smoothly inserted into the casing 2.

Figure 4C:
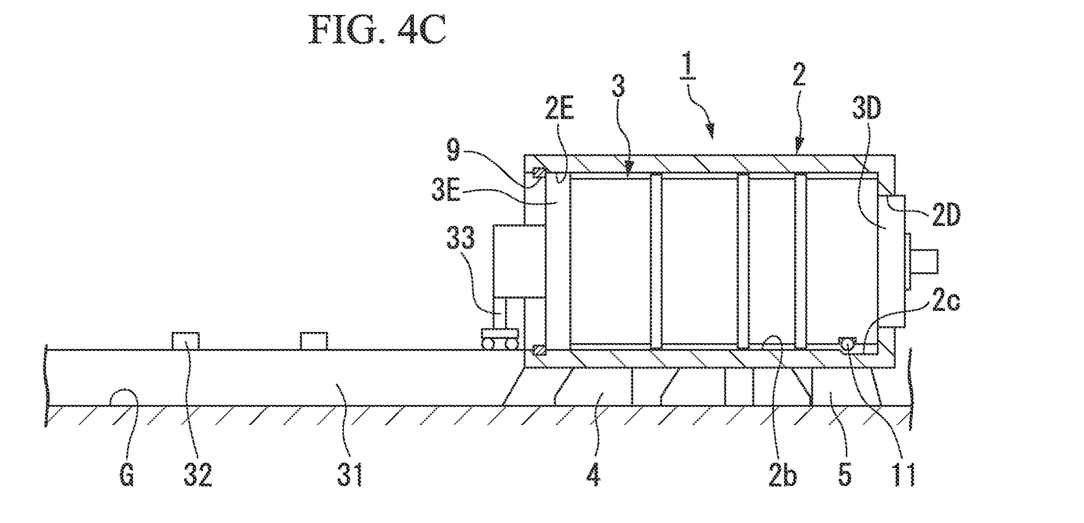
FIG. 4C is a schematic cross-sectional view showing the assembly method of the compressor shown in FIGS. 1 and 2.

Thereafter, as shown in FIG. 4C, the fitting outer diameter portion 3D of the front end portion of the bundle 3 is fitted to the fitting inner diameter portion 2D of the front end portion of the casing 2, the fitting outer diameter portion 3E of the rear end portion of the bundle 3 is fitted to the fitting inner diameter portion 2E of the rear end portion of the casing 2, and thus, the bundle 3 is completely accommodated inside the casing 2. Moreover, when the bundle is completely accommodated inside the casing, the roller 11 is positioned within the range of the recessed portion 2*c* and is separated from the inner circumferential surface 2*b* of the casing 2.

Finally, the mounting table 31 or the bogie 33 is removed, the lock ring 9 is mounted, and thus, the assembly of the compressor 1 is completed, and the operation of the compressor 1 can be performed.

As described above, according to the compressor 1 of the present embodiment, in the state where the curvature center C2 of the center curved surface portion 23*a* configuring the outer circumferential surface 23 of the roller 11 is positioned on the axis C1 of the casing 2, only the center curved surface portion 23*a* in the outer circumferential surface 23 of the roller main body 22 abuts the inner circumferential surface 2*b* of the casing 2, and the end side curved surface portion 23*b* does not abut the inner circumferential surface 2*b*. In other words, a partial contact of the roller 11 with respect to the inner circumferential surface 2*b* of the casing 2 can be prevented.

Moreover, in this state, since the center curved surface portion 23*a* contacts the inner circumferential surface 2*b* of the casing 2 in the circumferential direction about the curvature center C2, the center curved surface portion 23*a* is evenly pressed against the inner circumferential surface 2*b* of the casing 2, and an increase in the deviation of a surface pressure along the rotating shaft 21 can be suppressed. In other words, uniformity in the distribution of the surface pressure along the rotating shaft 21 of the roller 11 can be improved.

Moreover, the curvature center C2 (or the curvature center of the bundle 3) of the center curved surface portion 23*a* is positioned to be deviated from the axis C1 of the casing 2 or the like, and thus, even when the position of the outer circumferential surface 23 of the roller 11 strongly abutting the inner circumferential surface 2*b* of the casing 2 is shifted from the center curved surface portion 23*a* to the end side curved surface portion 23*b* side, the center curved surface portion 23*a* and the end side curved surface portion 23*b* are smoothly continuous to each other, the surface pressure acting between the center curved surface portion 23*a* and the end side curved surface portion 23*b* can be suppressed from being excessively larger than the surface pressures on other portions.

In addition, the curvature center C2 of the center curved surface portion 23*a* is positioned to be deviated from the axis C1 of the casing 2 or the like, and thus, even when the end side curved surface portion 23*b* is pressed against the inner circumferential surface 2*b* of the casing 2, the curvature radius R3 of the end side curved surface portion 23*b* is set to be smaller than the curvature radius R2 of the center curved surface portion 23*a*, the surface pressure on the end side curved surface portion 23*b* is securely prevented from being larger than the surface pressure on the center curved surface portion 23*a*, that is, the occurrence of the partial contact of the roller 11 can be securely prevented.

As described above, the partial contact of the roller 11 with respect to the inner circumferential surface 2*b* of the casing 2 or the like is prevented, an increase in the deviation of the surface pressure along the rotating shaft 21 of the roller 11 can be suppressed, and thus, the occurrence of impression of the roller 11 on the inner circumferential surface 2*b* of the casing 2 is prevented, and a decrease in the quality of the compressor 1 can be suppressed.

Moreover, in the compressor 1 of the present embodiment, the outer circumferential surface 23 of the roller main body 22 abuts the inner circumferential surface 2*b* of the casing 2 so that the rotating shaft 21 is inclined with respect to the horizontal surface. Accordingly, the position of the outer circumferential surface 23 of the roller 11 strongly abutting the inner circumferential surface 2*b* of the casing 2 is easily shifted to the one end side curved surface portion 23*b*1 side which is positioned vertically below the center curved surface portion 23*a* due to the weight of the bundle 3.

Therefore, as described above, the curvature radius R31 of the one end side curved surface portion 23*b*1 is set to be smaller than the curvature radius R32 of the other end side curved surface portion 23*b*2 positioned vertically above the center curved surface portion, and thus, in the outer circumferential surface 23 of the roller 11, the occurrence of the partial contact on the end side positioned vertically below the center in the direction of the rotating shaft 21 can be securely prevented.

Second Embodiment

Next, a second embodiment of the present invention will be described with reference to FIG. 5.

Compared to the compressor of the first embodiment, in this embodiment, only the structure of the roller 11 is different from each other, and other configurations are similar to those of the first embodiment. In the present embodiment, the same reference numerals are assigned to the same components as the first embodiment, and descriptions thereof are omitted here.

Figure 5:
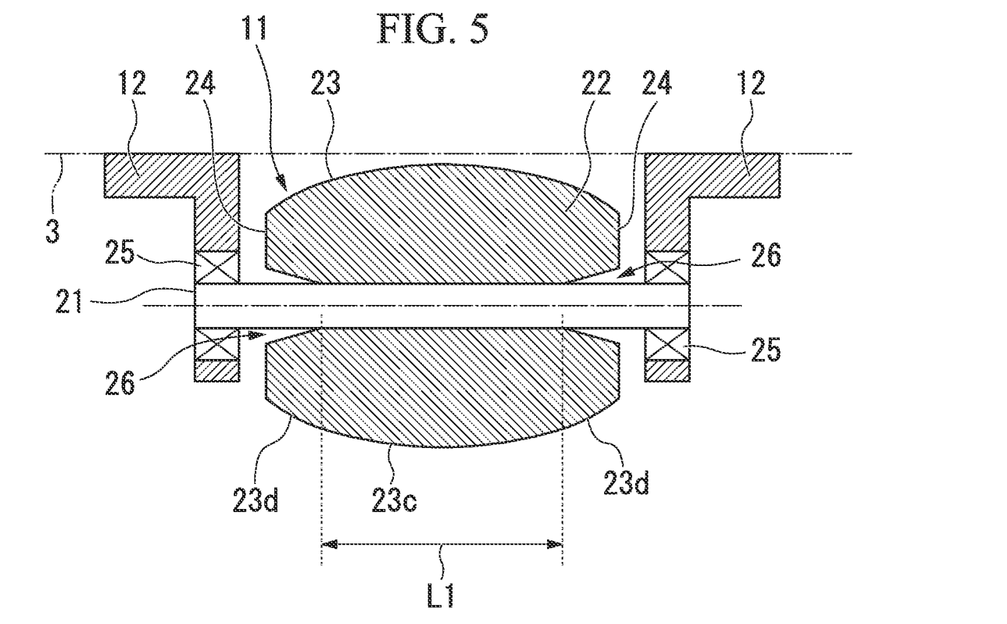
FIG. 5 is a schematic cross-sectional view showing an example of a roller configuring a compressor according to a second embodiment of the present invention.

As shown in FIG. 5, similar to the first embodiment, the roller 11 of the present embodiment includes the rotating shaft 21 and the roller main body 22, and the outer circumferential surface 23 of the roller main body 22 of the present embodiment is formed in a convex curved surface in which the center portion in the rotation axis direction expands to the outside in the radial direction. Moreover, the convex curved surface is formed to be continuous from the center of the outer circumferential surface 23 of the roller main body 22 toward the end side.

However, in the present embodiment, the curvature radius of the outer circumferential surface 23 of the roller main body 22 is set to correspond to the curvature radius of the inner circumferential surface 2b of the casing 2, and is set to be constant along the circumferential direction about the curvature center.

Moreover, holes 26 extending from both end surfaces 24 of the roller main body 22 in the direction of the rotating shaft 21 are formed in end side range (end side regions 23d on the outer circumferential surface 23 of the roller main body 22) along the rotating shaft 21 in the roller main body 22 between the outer circumferential surface of the rotating shaft 21 and the inner circumferential surface of the roller main body 22. In addition, for example, the hole 26 may be formed in a rectangular cross-section. However, considering stiffness of the roller main body 22, as the shown example, preferably, the hole is formed in a V shaped cross-section in which the width is gradually narrowed from the end surface 24 in a depth direction of the hole 26.

Particularly, the hole 26 of the present embodiment is configured of a thinning portion formed on the inner circumferential surface of the roller main body 22. For example, a plurality of holes 26 may be arranged with intervals in the circumferential direction about the rotating shaft 21. However, preferably, the hole 26 is annularly formed about the rotating shaft 21.

A depth dimension of the hole 26 is set so that a tip in the extension direction of the hole 26 is positioned at a boundary between a center range (center region 23c) in the direction of the rotating shaft 21 set to the effective width L1 similar to the case of the first embodiment in the roller main body 22 and the above-described end side range (end side region 23d).

In the roller 11 configured as described above, when the end side region 23d in the outer circumferential surface 23 of the roller main body 22 is pressed to the inner side in the radial direction, the hole 26 is shrunk in the radial direction of the roller main body 22, and the end side range of the roller main body 22 is elastically deformed flexibly in the inner side in the radial direction. Moreover, if the hole 26 is annularly formed as described above, the end side range can be more easily deformed elastically.

According to the compressor of the present embodiment having the roller 11 configured as described above, effects similar to those of the first embodiment are exerted.

That is, the curvature radius of the outer circumferential surface 23 of the roller main body 22 of the present embodiment corresponds to the curvature radius of the inner circumferential surface 2b of the casing 2, the center region 23c of the outer circumferential surface 23 of the roller main body 22 is evenly pressed against the inner circumferential surface 2b of the casing 2, and thus, an increase in the deviation of the surface pressure along the rotating shaft 21 can be suppressed. In other words, uniformity in the distribution of the surface pressure along the rotating shaft 21 of the roller 11 can be improved.

In addition, in the present embodiment, since the curvature radius of the outer circumferential surface 23 of the roller main body 22 is set to be constant along the circumferential direction, the end side region 23d of the outer circumferential surface 23 of the roller main body 22 is also pressed against the inner circumferential surface 2b of the casing 2 similar to the center region 23c. However, when the end side region is pressed against the inner circumferential surface of the casing, since the end side range of the roller main body 22 is elastically deformed so as to be bent to the inner side in the radial direction of the roller 11, the center region 23c and the end side region 23d of the roller main body 22 are maintained so as to be in a state continued in smooth curved surfaces. Moreover, according to this deformation, since the curvature radius in the end side region 23d of the roller main body 22 is smaller than the curvature radius in the center region 23c, the surface pressure in the end side region 23d is suppressed so as to be smaller than the surface pressure in the center region 23c, and occurrence of the partial contact of the roller 11 can be prevented.

In addition, in the present embodiment, the curvature radius of the outer circumferential surface 23 of the roller main body 22 is set to be constant along the rotating shaft 21, that is, since the outer circumferential surface 23 of the roller main body 22 of the present embodiment is formed so as to be simpler than the outer circumferential surface 23 of the roller main body 22 of the first embodiment, the roller main body 22 can be easily manufactured, and the cost can be decreased.

Figure 6:
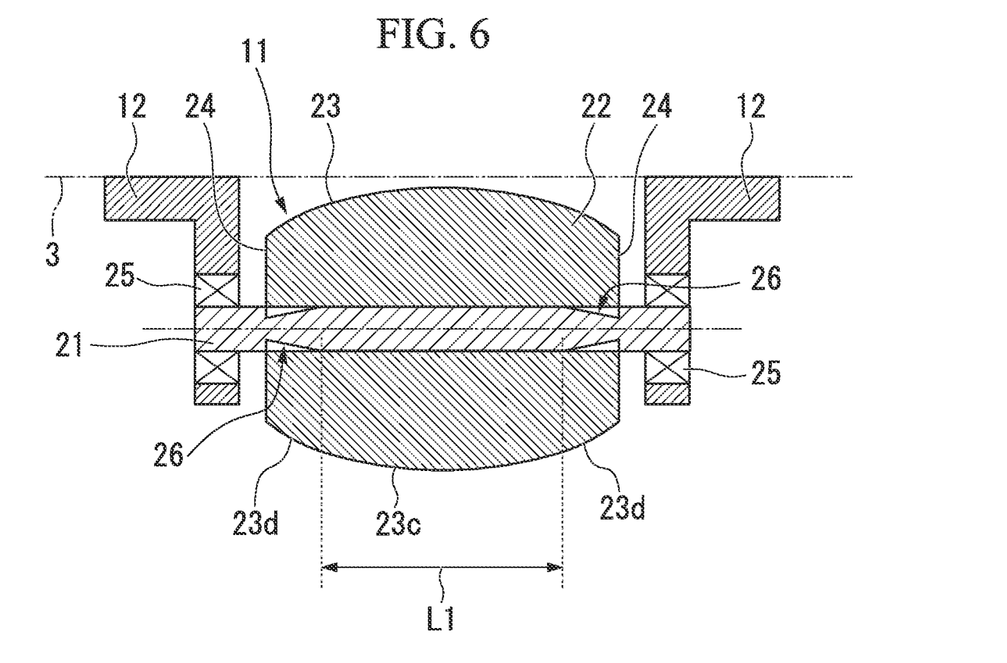
FIG. 6 is a schematic cross-sectional view showing a modification of the roller shown in FIG. 5.

Moreover, in the second embodiment, the hole 26 formed between the outer circumferential surface of the rotating shaft 21 and the inner circumferential surface of the roller main body 22 is not limited to the thinning portion formed on the inner circumferential surface of the roller main body 22 as shown in FIG. 5. For example, as shown in FIG. 6, the hole may be configured of a shrinking portion formed on the outer circumferential surface of the rotating shaft 21. Also in this case, considering the stiffness of the roller main body 22, preferably, similar to the hole 26 shown in FIG. 5, the hole is formed in a V shaped cross-section.

For example, the configuration of the above-described second embodiment may be combined to the configuration of the first embodiment.

Third Embodiment

Next, a third embodiment of the present invention will be described with reference to FIGS. 7 and 8.

Compared to the configuration of the second embodiment, in this embodiment, only the structure of the roller main body 22 is different from, and other configurations are similar to those of the second embodiment. In the present embodiment, the same reference numerals are assigned to the same components as the first embodiment, and descriptions thereof are omitted here.

Figure 7:
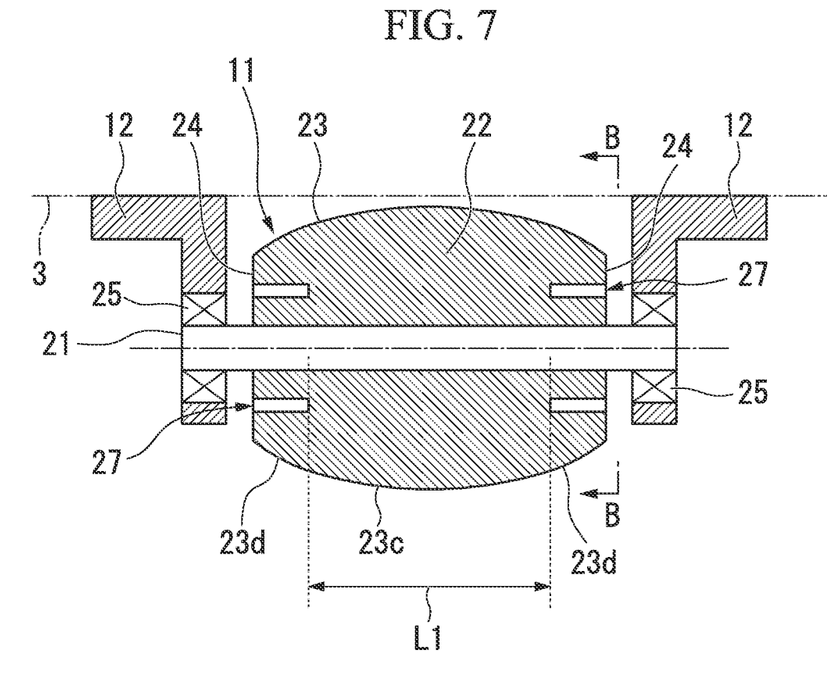
FIG. 7 is a schematic cross-sectional view showing an example of a roller configuring a compressor according to a third embodiment of the present invention.
Figure 8A:
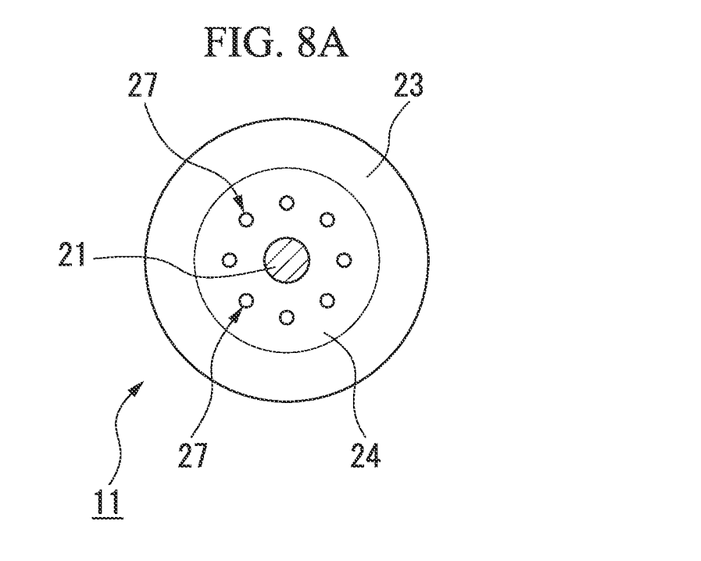
FIG. 8A is a cross-sectional view which exemplifies a shape of a blind hole formed on a roller main body of FIG. 7 and is taken along line B-B of FIG. 7, shows a first example of the blind hole, and exemplifies the shape of the hole when the roller main body shown in FIG. 7 is viewed from the end surface side.
Figure 8B:
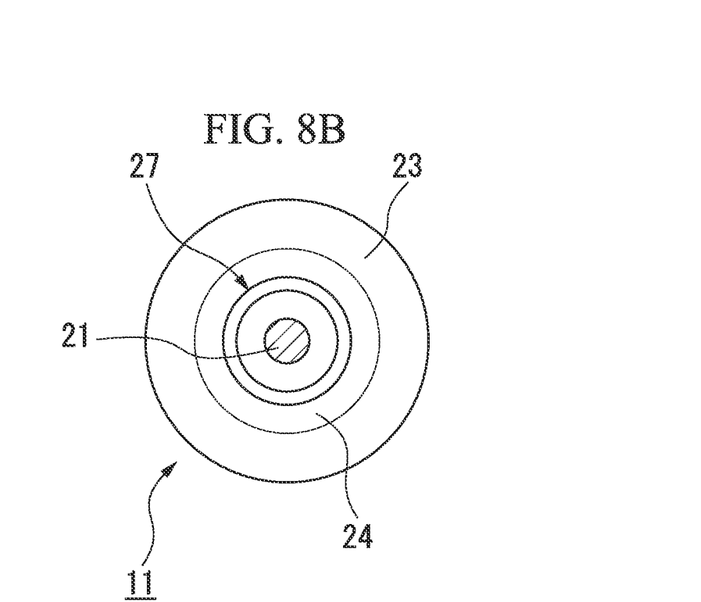
FIG. 8B is a cross-sectional view which exemplifies the shape of the blind hole formed on the roller main body of FIG. 7 and is taken along line B-B of FIG. 7, shows a second example of the blind hole, and exemplifies the shape of the hole when the roller main body shown in FIG. 7 is viewed from the end surface side.

As shown in FIG. 7, similar to the second embodiment, the roller 11 of the present embodiment includes the rotating shaft 21 and the roller main body 22, and the outer circumferential surface 23 of the roller main body 22 of the present embodiment is formed in a convex curved surface in which the center portion in the rotation axis direction expands to the outside in the radial direction. Moreover, the convex curved surface is formed to be continuous from the center of the outer circumferential surface 23 of the roller main body 22 toward the end side. Moreover, similar to the second embodiment, the curvature radius of the outer circumferential surface 23 of the roller main body 22 is also set to correspond to the curvature radius of the inner circumferential surface 2b of the casing 2, and is set to be constant along the circumferential direction about the curvature center.

In addition, blind holes 27 extending from both end surfaces 24 in the direction of the rotating shaft 21 of the roller main body 22 to the direction of the rotating shaft 21 are formed in end side ranges (end side regions 23*d* on the outer circumferential surface 23) along the rotating shaft 21 in the roller main body 22 of the present embodiment. Each of the blind holes 27 is formed at a position separated in the radial direction from the inner circumferential surface or the outer circumferential surface 23 of the roller main body 22, and is not opened to the inner circumferential surface or the outer circumferential surface 23 of the roller main body 22.

Moreover, similar to the hole 26 of the second embodiment, for example, considering the stiffness of the roller main body 22, the blind hole 27 may be formed in a V shaped cross-section. However, as the shown example, the blind hole 27 may be also formed in a rectangular cross-section. Moreover, for example, as shown FIG. 8A, a plurality of blind holes 27 are arranged with intervals in the circumferential direction. However, for example, as shown in FIG. 8B, preferably, the blind hole is annularly formed about the rotating shaft 21.

Similar to the hole 26 of the second embodiment, the depth dimension of the blind hole 27 is set so that a tip in the extension direction of the blind hole 27 is positioned at the boundary between a center range (center region 23*c*) in the direction of the rotating shaft 21 and the end side range (end side region 23*d*).

In the roller 11 configured as described above, when the end side region 23*d* in the outer circumferential surface 23 of the roller main body 22 is pressed to the inner side in the radial direction, the blind hole 27 is shrunk in the radial direction of the roller, and the end side range of the roller main body 22 is elastically deformed flexibly in the inner side in the radial direction. Moreover, if the blind hole 27 is annularly formed as shown in FIG. 8B, the end side range can be more easily deformed elastically.

According to the compressor having the roller 11 of the third embodiment configured as described above, effects similar to the compressor of the second embodiment are exerted.

In addition, for example, the configuration of the above-described third embodiment may be appropriately combined with the configuration of the first and second embodiments.

Fourth Embodiment

Next, a fourth embodiment of the present invention will be described with reference to FIG. 9.

Compared to the configuration of the first embodiment, in this embodiment, only the structure of the roller 11 is different, and other configurations are similar to those of the first embodiment. In the present embodiment, the same reference numerals are assigned to the same components as the first embodiment, and descriptions thereof are omitted here.

Figure 9:
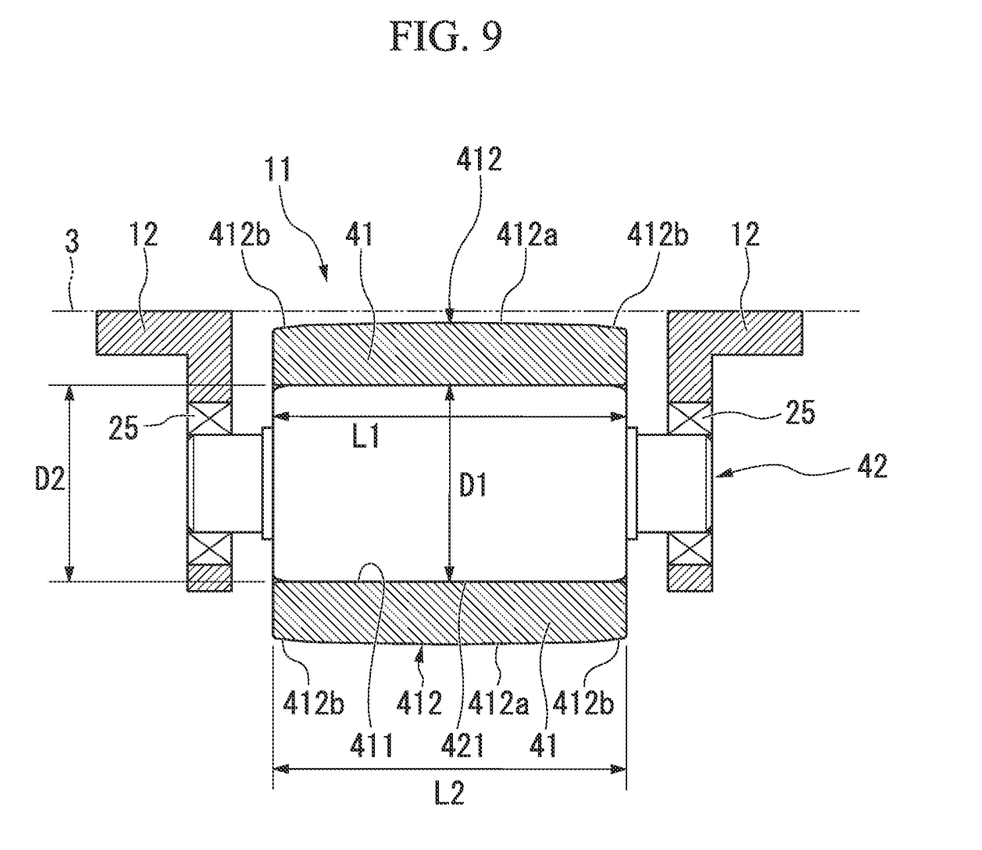
FIG. 9 is a schematic cross-sectional view showing an example of a roller configuring a compressor according to a fourth embodiment of the present invention.

As shown in FIG. 9, the roller 11 is mounted on the brackets 12 fixed to the lower portion in the vicinity of the front end of the bundle 3, and includes a roller main body 41 and a rotating shaft 42 which is provided to penetrate the roller main body 41.

Compared to the casing 2 formed of a material having relatively high hardness such as SFVC1 or SCPL1, for example, the roller main body 41 is an approximately cylindrical member which is formed of a material (for example, CAC304 which is a copper based material) having relatively low hardness. A rotating shaft insertion hole 411 which has an inner diameter D1 passes through the roller main body 41 in the axial direction thereof. In addition, similar to the first embodiment, the outer circumferential surface 412 of the roller main body 41 is configured of a center curved surface portion 412*a* which is formed to have a curvature radius corresponding to a curvature radius of the inner circumferential surface 2*b* of the casing 2 in a center range along the rotating shaft 42, and a pair of end side curved surface portions 412*b* having a curvature radius smaller than that of the center curved surface portion 412*a*.

The rotating shaft 42 is an approximately columnar member which is formed of a material having higher strength (for example, an iron based material or the like) than the roller main body 41. Moreover, the "material having high strength" in the present specification means a material having a relatively higher Young's modulus, bending strength, tensile strength, or the like. A large diameter portion 421 having a larger diameter than the diameters of both end portions is provided on a center portion in the axial direction of the rotating shaft 42. Moreover, an outer diameter D2 of the large diameter portion 421 is set to be slightly larger than the inner diameter D1 of the rotating shaft insertion hole 411 of the roller main body 41, and an axial length L2 of the large diameter portion is set to be approximately the same as an axial length L1 of the rotating shaft insertion hole 411.

The roller main body 41 is fitted to the large diameter portion 421 of the rotating shaft 42 having the above-described configuration by shrinkage fitting, and thus, is integrated with the roller main body 41. Moreover, both end portions of the rotating shaft 42 integrated with the roller main body 41 are mounted on bearings 25 fixed to the brackets 12, and thus, the rotating shaft 42 is rotatably supported.

According to the compressor having the roller 11 of the fourth embodiment configured as described above, since the roller main body 41 is configured of a material having lower hardness than that of the casing 2, when the roller 11 rolls on the inner circumferential surface 2*b* of the casing 2, the inner circumferential surface 2*b* is not easily damaged even when the inner circumferential surface contacts the roller main body 41.

In addition, since the outer circumferential surface 412 of the roller main body 41 is configured of the center curved surface portion 412*a* and the pair of end side curved surface portions 412*b*, similar to the first embodiment, uniformity in the distribution of the surface pressure of the roller main body 41 along the rotating shaft 42 of the roller 11 can be improved.

In addition, since the rotating shaft 42 is formed of a material having higher strength than that of the roller main body 41, the rotating shaft 42 is not easily damaged even when the weight of the bundle 3 is applied to the shaft. Moreover, the large diameter portion 421 is formed in the rotating shaft 42, the center portion in the axial direction is reinforced, and thus, even when a reaction force is operated from the inner circumferential surface 2*b* of the casing 2, bending or buckling in the center portion in the axial direction of the rotating shaft 42 does not easily occur.

As above, the present invention is described in detail. However, the present invention is not limited to the above-described embodiment, and various modifications can be applied within a scope which does not depart from the gist of the present invention.

For example, in the first to third embodiments, the roller 11 is configured so that the rotating shaft 21 and the roller main body 22 formed of materials different from each other are integrally fixed. However, for example, the rotating shaft 21 and the roller main body 22 may be configured so as to be integrally formed of the same material.

INDUSTRIAL APPLICABILITY

The present invention relates to a compressor configured to compress a fluid.

According to the present invention, a partial contact or the like of a roller with respect to an inner circumferential surface of a casing is prevented, an increase in the deviation of a surface pressure along a rotating shaft of the roller can be suppressed, and thus, the occurrence of impression on the inner circumferential surface of the casing is prevented, and a decrease in the quality of the compressor can be suppressed.

REFERENCE SIGNS LIST

1: compressor, 2: casing, 2b: inner circumferential surface, 3: bundle, 7: stationary member, 8: rotor, 11: roller, 21 and 42: rotating shaft, 22 and 41: roller main body, 23 and 412: outer circumferential surface, 23a and 412a: center curved surface portion, 23b, 23b1, 23b2, and 412b: end side curved surface portion, 23c: center region, 23d: end side region, 24: end surface, 26: hole, 27: blind hole, C1: axis, R2, R3, R31, and R32: curvature radius

The invention claimed is:

1. A compressor comprising:
a cylindrical casing;
a bundle which includes a tubular stationary member and a rotor accommodated into the stationary member, the bundle being configured to be inserted into an inner portion of the cylindrical casing;
brackets fixed to the bundle;
bearings fixed to the brackets; and
a pair of right and left rollers, each of the pair of right and left rollers including a roller main body and a rotatable shaft, wherein both ends of the rotatable shaft are supported by a respective pair of the bearings, and the pair of right and left rollers is configured to roll on an inner circumferential surface of the cylindrical casing while supporting the bundle when the bundle is inserted into the inner portion of the cylindrical casing along an axial direction,
wherein:
an outer circumferential surface of each of the pair of right and left rollers includes a center curved surface portion having a first curvature radius and an end side curved surface portion having a second curvature radius, the end side curved surface portion being positioned at an end of the center curved surface portion;
the center curved surface portion and the end side curved surface portion define a continuous convex curved surface;
in a state where the outer circumferential surface of each of the pair of right and left rollers abuts the inner circumferential surface of the cylindrical casing, the first curvature radius is the same as a curvature radius of the inner circumferential surface of the cylindrical casing and is larger than the second curvature radius;
the end side curved surface portion is a first end side curved surface portion;
the end of the center curved surface portion is a first end of the center curved surface;
the outer circumferential surface of each of the right and left rollers further includes a second end side curved surface portion;

the second end side curved surface portion is positioned at a second end of the center curved surface portion;
the second end side curved surface portion has a third curvature radius;
each of the pair of right and left rollers is at a position which is offset from a vertical centerline of the bundle extending in a radial direction of the bundle;
the second end side curved surface portion of the right roller is at a vertically lower side of the right roller than the first end side curved surface portion of the right roller;
the second end side curved surface portion of the left roller is at a vertically lower side of the left roller than the first end side curved surface portion of the left roller; and
the third curvature radius is smaller than the second curvature radius.

2. The compressor according to claim 1,
wherein a hole which extends from an end surface of the right roller in a rotation axis direction of the right roller is defined in the right roller in a range of an end side along the rotatable shaft of the right roller, and
wherein a hole which extends from an end surface of the left roller in a rotation axis direction of the left roller is defined in the left roller in a range of an end side along the rotatable shaft of the left roller.

3. The compressor according to claim 2,
wherein the hole of the right roller is annularly defined about the rotatable shaft of the right roller, and
wherein the hole of the left roller is annularly defined about the rotatable shaft of the left roller.

4. The compressor according to claim 3,
wherein the hole of the right roller is defined in a V-shaped cross section which narrows from the end surface of the right roller toward an extension direction of the hole of the right roller, and
wherein the hole of the left roller is defined in a V-shaped cross section which narrows from the end surface of the left roller toward an extension direction of the hole of the left roller.

5. The compressor according to claim 2,
wherein the hole of the right roller is defined in a V-shaped cross section which narrows from the end surface of the right roller in a depth direction of the hole of the right roller, and
wherein the hole of the left roller is defined in a V-shaped cross section which narrows from the end surface of the left roller in a depth direction of the hole of the left roller.

6. The compressor according to claim 1,
wherein the roller main body of the right roller is formed of a material having lower hardness than that of the cylindrical casing, and the rotatable shaft of the right roller is configured to be inserted into the roller main body of the right roller and is formed of a material having higher strength than that of the roller main body of the right roller, and
wherein the roller main body of the left roller is formed of a material having lower hardness than that of the cylindrical casing, and the rotatable shaft of the left roller is configured to be inserted into the roller main body of the left roller and is formed of a material having higher strength than that of the roller main body of the left roller.

7. The compressor according to claim 6,
wherein the roller main body of the right roller is fixed to the rotatable shaft of the right roller by shrinkage fitting, and
wherein the roller main body of the left roller is fixed to the rotatable shaft of the left roller by shrinkage fitting.

8. A compressor comprising:
a cylindrical casing;
a bundle which includes a tubular stationary member and a rotor accommodated into the stationary member, the bundle being configured to be inserted into an inner portion of the cylindrical casing; and
a pair of right and left rollers configured to roll on an inner circumferential surface of the cylindrical casing while supporting the bundle when the bundle is inserted into the inner portion of the cylindrical casing along an axial direction,
wherein:
each of the pair of right and left rollers includes a rotatable shaft;
a shrinking portion is defined in an outer circumferential surface of the rotatable shaft and a diameter of the rotatable shaft is reduced at the shrinking portion;
an outer circumferential surface of each of the pair of right and left rollers includes a center curved surface portion having a first curvature radius and an end side curved surface portion having a second curvature radius, the end side curved surface portion being positioned at an end of the center curved surface portion;
the center curved surface portion and the end side curved surface portion define a continuous convex curved surface;
in a state where the outer circumferential surface of each of the pair of right and left rollers abuts the inner circumferential surface of the cylindrical casing, the first curvature radius is the same as a curvature radius of the inner circumferential surface of the cylindrical casing and is larger than the second curvature radius;
the end side curved surface portion is a first end side curved surface portion;
the end of the center curved surface portion is a first end of the center curved surface;
the outer circumferential surface of each of the pair of right and left rollers further includes a second end side curved surface portion;
the second end side curved surface portion is positioned at a second end of the center curved surface portion;
the second end side curved surface portion has a third curvature radius;
each of the pair of right and left rollers is at a position which is offset from a vertical centerline of the bundle extending in a radial direction of the bundle;
the second end side curved surface portion of the right roller is at a vertically lower side of the right roller than the first end side curved surface portion of the right roller;
the second end side curved surface portion of the left roller is at a vertically lower side of the left roller than the first end side curved surface portion of the left roller; and
the third curvature radius is smaller than the second curvature radius.

9. A compressor comprising:
a cylindrical casing;
a bundle which includes a tubular stationary member and a rotor accommodated into the stationary member, the bundle being configured to be inserted into an inner portion of the cylindrical casing; and
a plurality of rollers including a first roller and a second roller configured to roll on an inner circumferential surface of the cylindrical casing while supporting the bundle when the bundle is inserted into the inner portion of the cylindrical casing along an axial direction,
wherein:
an outer circumferential surface of each of the first roller and the second roller includes a center curved surface portion having a first curvature radius and an end side curved surface portion having a second curvature radius, the end side curved surface portion being positioned at an end of the center curved surface portion;
the center curved surface portion and the end side curved surface portion define a continuous convex curved surface;
in a state where the outer circumferential surface of each of the first roller and the second roller abuts the inner circumferential surface of the cylindrical casing, the first curvature radius is the same as a curvature radius of the inner circumferential surface of the cylindrical casing and is larger than the second curvature radius;
the end side curved surface portion is a first end side curved surface portion;
the end of the center curved surface portion is a first end of the center curved surface;
the outer circumferential surface of each of the first roller and the second roller further includes a second end side curved surface portion;
the second end side curved surface portion is positioned at a second end of the center curved surface portion;
the second end side curved surface portion has a third curvature radius;
the second end side curved surface portion of the first roller is at a vertically lower side of the first roller than the first end side curved surface portion of the first roller;
the second end side curved surface portion of the second roller is at a vertically lower side of the second roller than the first end side curved surface portion of the second roller; and
the third curvature radius is smaller than the second curvature radius.

10. The compressor according to claim 9, wherein:
the first roller deviates from a vertically lower end of the bundle by a predetermined angle in a first circumferential direction of the bundle; and
the second roller deviates from the vertically lower end of the bundle by the predetermined angle in a second circumferential direction of the bundle.

11. The compressor according to claim 10,
wherein the predetermined angle is determined based on a disposition relationship between the bundle, and suction and discharge nozzles that are on an outer circumferential portion of the cylindrical casing.

* * * * *